(12) United States Patent
Osburn, III (10) Patent No.: US 8,364,950 B1
(45) Date of Patent: Jan. 29, 2013

(54) AUDITABLE CRYPTOGRAPHIC PROTECTED COMMUNICATION SYSTEM

(75) Inventor: Douglas C. Osburn, III, Houston, TX (US)

(73) Assignee: DJ Inventions, LLC, Houston, TX (US)

( * ) Notice: Subject to any disclaimer, the term of this patent is extended or adjusted under 35 U.S.C. 154(b) by 0 days.

(21) Appl. No.: 13/552,396

(22) Filed: Jul. 18, 2012

(51) Int. Cl.
*H04L 29/06* (2006.01)

(52) U.S. Cl. .................. 713/153; 713/194

(58) Field of Classification Search ............ 713/153, 713/194
See application file for complete search history.

(56) References Cited

U.S. PATENT DOCUMENTS

| | | | |
|---|---|---|---|
| 5,638,378 A | 6/1997 | Scop et al. | |
| 5,719,771 A | 2/1998 | Buck et al. | |
| 5,745,384 A | 4/1998 | Lanzerotti et al. | |
| 5,794,009 A | 8/1998 | Coleman et al. | |
| 5,812,394 A | 9/1998 | Lewis et al. | |
| 6,032,154 A | 2/2000 | Coleman et al. | |
| 6,411,987 B1 | 6/2002 | Steger et al. | |
| 6,628,992 B2 | 9/2003 | Osburn, III | |
| 6,658,349 B2 | 12/2003 | Cline | |
| 6,687,573 B2 | 2/2004 | Egolf et al. | |
| 6,751,562 B1 | 6/2004 | Blackett et al. | |
| 6,950,851 B2 | 9/2005 | Osburn, III | |
| 6,961,753 B1 | 11/2005 | Osburn, III | |
| 7,073,183 B2 | 7/2006 | Hekizono | |
| 7,225,248 B1 | 5/2007 | Osburn, III | |
| 7,286,914 B2 | 10/2007 | Cerchione et al. | |
| 7,587,481 B1 | 9/2009 | Osburn, III | |
| 7,646,298 B1 | 1/2010 | Osburn, III et al. | |
| 7,673,337 B1 * | 3/2010 | Osburn et al. ............ | 726/12 |
| 7,673,338 B1 | 3/2010 | Osburn, III et al. | |
| 7,747,710 B1 | 6/2010 | Osburn, III et al. | |
| 7,822,966 B2 * | 10/2010 | Ranganathan ............ | 713/2 |
| 2004/0217900 A1 | 11/2004 | Martin et al. | |
| 2004/0244265 A1 | 12/2004 | Miyata et al. | |
| 2005/0138120 A1 | 6/2005 | Gundersen et al. | |
| 2008/0294893 A1 * | 11/2008 | Kao et al. ............ | 713/164 |
| 2009/0129586 A1 * | 5/2009 | Miyazaki et al. ........ | 380/28 |

FOREIGN PATENT DOCUMENTS

JP         53098861         8/1978

* cited by examiner

*Primary Examiner* — Jeffrey D Popham
(74) *Attorney, Agent, or Firm* — Buskop Law Group, PC; Wendy Buskop (57) ABSTRACT

An auditable cryptographic protected communication system for connecting an enterprise server to a plurality of industrial devices using messaging protocols for each industrial device enabling the industrial devices to receive commands and transmit status and measurement data using the individual device messaging protocols over a network.

14 Claims, 5 Drawing Sheets

AUDITABLE CRYPTOGRAPHIC PROTECTED COMMUNICATION SYSTEM

FIELD

The present embodiments relate to an auditable cryptographic communication system which provides security between an enterprise server and industrial devices while allowing continuous configuration and reconfiguration online, with continual monitoring that provides updates without shutting off the industrial devices, without shutting off the security system, and without shutting off the enterprise server.

BACKGROUND

A need exists for a security system that can provide in-band communication to industrial devices from an enterprise server while allowing out-of-band communication between the enterprise server and the security devices, which include software termed "cryptographic manager tool," and a hardware/software product termed "physical cryptographic module."

A need exists for a high security communication system usable with a plurality of different networks simultaneously and/or consecutively, between an enterprise server and a plurality of industrial devices.

A need exists for a secure communication system that is auditable over many networks simultaneously, as the owner of an enterprise server or an industrial device may not control the intervening networks over which the communication may need to occur, which can include a radio/cellular network, the internet, a corporate network, and a local area control network consecutively or simultaneously.

A further need exists for a cryptographic communication system that provides security between an enterprise server and industrial devices, provides measurement and control data while the enterprise server continuously configures and reconfigures online one or more additional industrial devices, and allows continual monitoring without shutting off industrial devices, a security system, and/or an enterprise server.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present system in detail, it is to be understood that the system is not limited to the particular embodiments and that they can be practiced or carried out in various ways.

The present embodiments relate to a cryptographic communication system, which can provide security between an enterprise server and industrial devices while allowing continuous configuration and reconfiguration online with continual monitoring that can provide updates, such as, in less than 25 seconds, without shutting off industrial devices, a security system, and/or an enterprise server.

The term "out-of-band for the enterprise server" as used herein can refer to bidirectional messaging from the enterprise server to components of the cryptographic communication system which can provide security between an enterprise server and industrial devices.

Out-of-band messaging can include commands for implementing diagnostics, testing, performing maintenance, or executing the performance steps required for components of the cryptographic communication system. Out-of-band messaging does not include commands for maintenance and performance of the industrial device to which the cryptographic communication system is connected. Out-of-band messaging can also be used for communicating historical logs that document the performance of security measures, and for messaging information concerning the generation and distribution of cryptographic keys used for validations, key exchanges, and communication sessions by the cryptographic communication system.

The term "in-band" as used herein can refer to bidirectional communication between the enterprise server and one or more connected industrial devices over the cryptographic communication system in the messaging protocol of each industrial device.

The term "out-of-band for the cryptographic manager tool" as used herein can refer to messaging from the cryptographic manager tool to a plurality of physical cryptographic modules of the cryptographic communication system.

The term "cryptographic messaging" can refer to both "in-band" and "out-of-band" messaging that can also include telemetry, which is encrypted between the virtual cryptographic module of the cryptographic manager tool and one or more of the plurality of physical cryptographic modules connected on the network.

The term "cryptographic time outs" as used herein can refer to periods of time, known in the industry as "cryptographic periods," that have been pre-established and stored in the cryptographic manager tool. They can include cryptographic manager tool settings that have been preset by a user based on best practice recommendations from cyber security authorities, such as the US government's National Institute of Standards and Technology (NIST) and corporate security policies, for encrypting information from one or more of a plurality of industrial devices based on the type of industrial device, the type of information being transmitted and/or received, and the level of terrorism or hacking that the industrial device generally experiences.

The cryptographic communication system can provide cryptographic keys. Conventionally, the generation of authentication keys or cryptographic keys has been time intensive for central processing units. The cost in performance needed to be balanced against the cost in security. Users have had to balance the time required to generate cryptographic keys (in minutes) against the need for cryptographic keys in communication.

The cryptographic communication system can enable the user to choose a more frequent key generation or a less frequent key generation depending on best practices, NIST standards, and/or corporate security policies.

The cryptographic communication system can help the American economy stay operational in view of hacking attacks.

The present system allows keys to be generated for critical information needed by the user and for other information as designated by the operator of the system, allowing a very fast but very secure encryption/decryption system to operate between industrial devices and enterprise servers over a plurality of uncontrolled networks, simultaneously, sequentially, or combinations thereof.

The term "uncontrolled" as used herein can mean that the network is not within the control of the owner of the enterprise server or the owner of one or more of the industrial devices. In some cases, the enterprise server owner can also be the industrial device owner. An uncontrolled network can be unsecured and/or unencrypted.

The cryptographic communication system can allow a user to decide how much time the system spends generating keys, in view of the cost of having greater or lesser security, by allowing the user to select cryptographic time outs.

The cryptographic communication system can provide an auditable cryptographic protected communication system for connecting an enterprise server with a plurality of industrial devices using the messaging protocol of each industrial device to receive commands and transmit status and measurement data over a network using communications divided between in-band and out-of-band communications.

Figure 1:
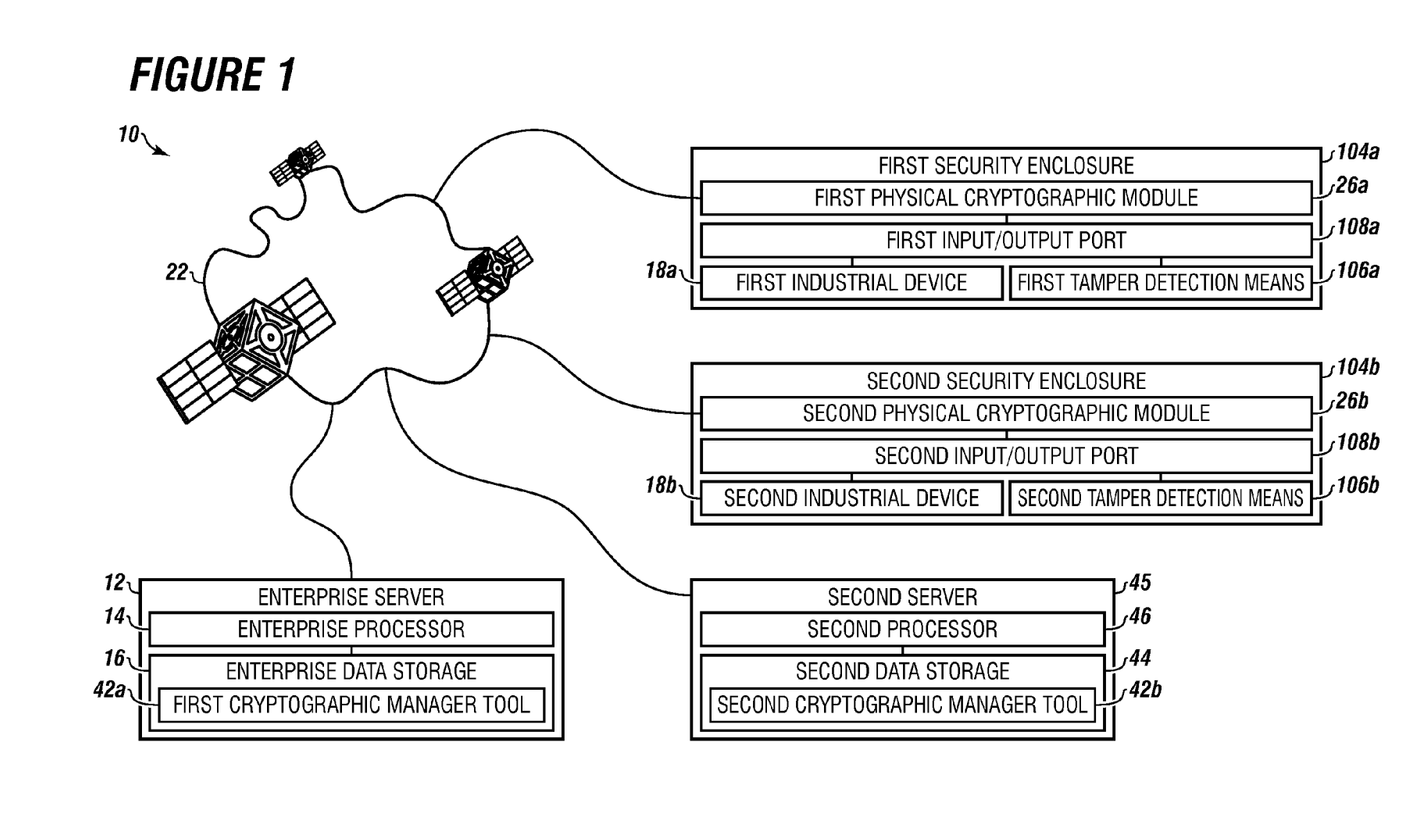
FIG. 1 depicts an overview of a cryptographic communication system.

Turning now to the Figures, FIG. 1 depicts an auditable cryptographic protected communication system 10 for connecting to an enterprise server 12 and one or more industrial devices, such as first industrial device 18a and second industrial device 18b.

The enterprise server 12 can include an enterprise processor 14 and an enterprise data storage 16. The enterprise server 12 can be a cloud application.

The enterprise server 12 can communicate using in-band and out-of-band messages to one or more of a plurality of physical cryptographic modules, such as first physical cryptographic module 26a and second physical cryptographic module 26b. Each physical cryptographic modules 26a and 26b can communicate with one or more of the industrial devices 18a and 18b.

A first cryptographic manager tool 42a can be located in the enterprise server 12. A second cryptographic manager tool 42b can be located in a second server 45.

The second server 45 can include a second processor 46 and a second data storage 44.

The enterprise server 12 can transmit commands to the industrial devices 18a and 18b in the respective messaging protocols of the industrial devices 18a and 18b through the first cryptographic manager tool 42a.

The industrial devices 18a and 18b can receive commands in unique messaging protocols. The first industrial device 18a can have a first messaging protocol, and the second industrial device 18b can have a second messaging protocol. The industrial devices 18a and 18b can transmit status and measurement data in unique messaging protocols over one or more networks 22. The network 22 can be a combination of dissimilar networks, a combination of similar networks, or combinations thereof. The network 22 can be an uncontrolled network.

The auditable cryptographic protected communication system 10 can include a first security enclosure 104a. The first security enclosure 104a can house the first physical cryptographic module 26a located therein. The first physical cryptographic module 26a can have a first input/output port 108a.

The first input/output port 108a can be in communication with the first industrial device 18a and a first tamper detection means 106a.

The auditable cryptographic protected communication system 10 can include a second security enclosure 104b. The second security enclosure 104b can house the second physical cryptographic module 26b located therein. The second physical cryptographic module 26b can have a second input/output port 108b. The second input/output port 108b can be in communication with the second industrial device 18b and a second tamper detection means 106b.

The physical cryptographic modules 26a and 26b can communicate with the second server 45, the enterprise server 12, or combinations thereof. The physical cryptographic modules 26a and 26b can provide a communication path allowing for the industrial devices 18a and 18b to communicate through in-band and/or out-of-band messages with the second server 45, the enterprise server 12, or combinations thereof.

The cryptographic manager tools 42a and 42b can each handle up to 2,000 industrial devices simultaneously.

Figure 2:
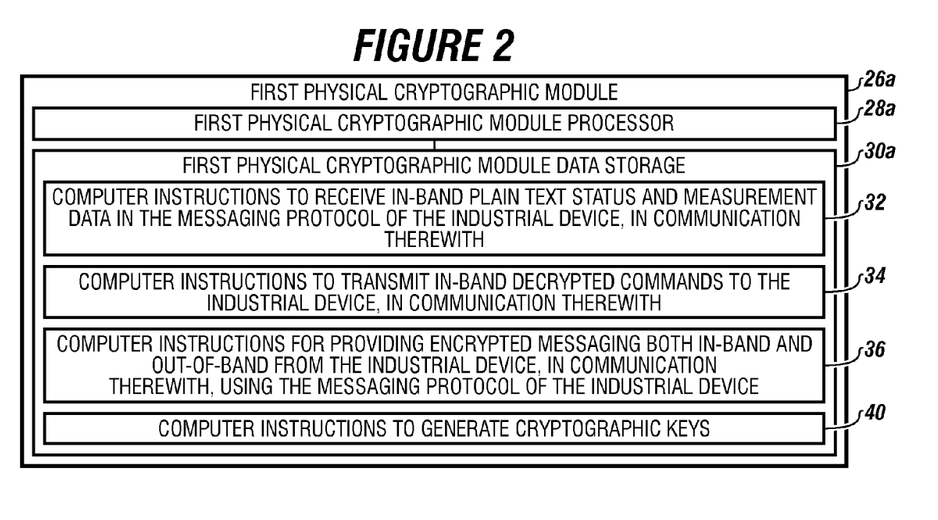
FIG. 2 depicts a diagram of computer instructions in the data storage of physical cryptographic modules usable with a cryptographic manager tool.

FIG. 2 depicts a schematic of the first physical cryptographic module 26a.

The first physical cryptographic module 26a can include a first physical cryptographic module processor 28a and a first physical cryptographic module data storage 30a.

The first physical cryptographic module data storage 30a can contain computer instructions to receive in-band plain text status and measurement data in the messaging protocol of the industrial device, in communication therewith 32 to which the first physical cryptographic module 26a is connected. For example, an in-band plain text message from the first physical cryptographic module to the industrial device can be a command to send status and measurement data.

The first physical cryptographic module data storage 30a can also contain computer instructions to transmit in-band decrypted commands to the industrial device, in communication therewith 34. An example of an in-band decrypted command to the industrial device which is decrypted by the first physical cryptographic module can be a command that opens a certain valve.

The first physical cryptographic module data storage 30a can contain computer instructions for providing encrypted messaging both in-band and out-of-band from the industrial device, in communication therewith, using the messaging protocol of the industrial device 36.

The physical cryptographic module data storage 30a can contain computer instructions to generate cryptographic keys 40. The cryptographic keys can be used to create digital signatures in authentication certificates; cryptographic key exchanges; and cryptographic communication sessions between the plurality of virtual cryptographic modules and the plurality of physical cryptographic modules without human intervention, allowing online encryption and decryption of plain text commands, status and measurement data, messages, log information, and alarm messages without turning off any operating industrial devices, and without turning off the enterprise server while creating an auditable communication pathway from the enterprise server to operating industrial devices. An example of a cryptographic key can be a public key to decrypt a digital signature on an authentication certificate.

Figure 3A:
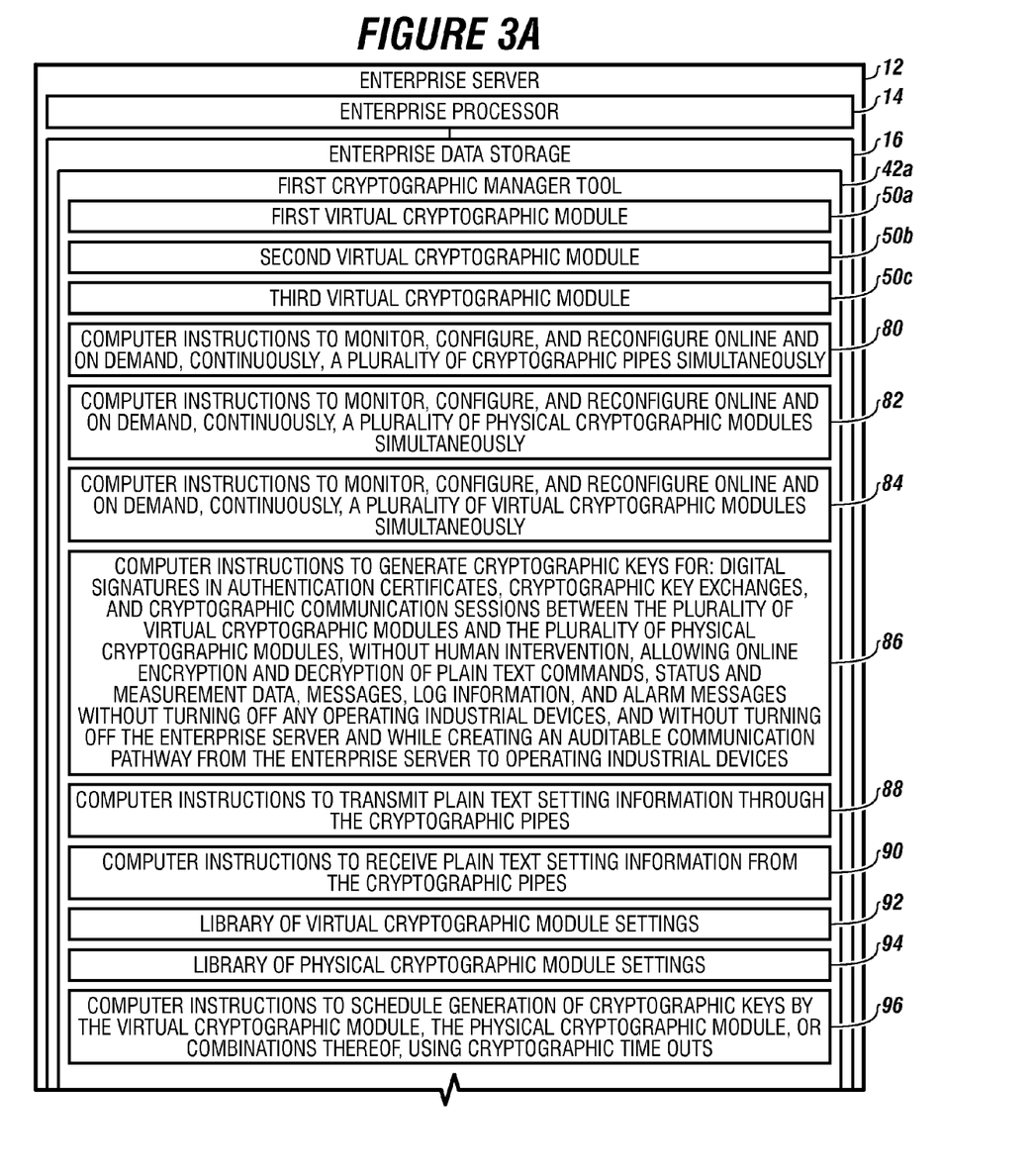
FIGS. 3A and 3B depict a diagram of computer instructions in the data storage of a cryptographic manager tool that can reside in the data storage of an enterprise server or the data storage of a second server connected to a network.
Figure 3B:
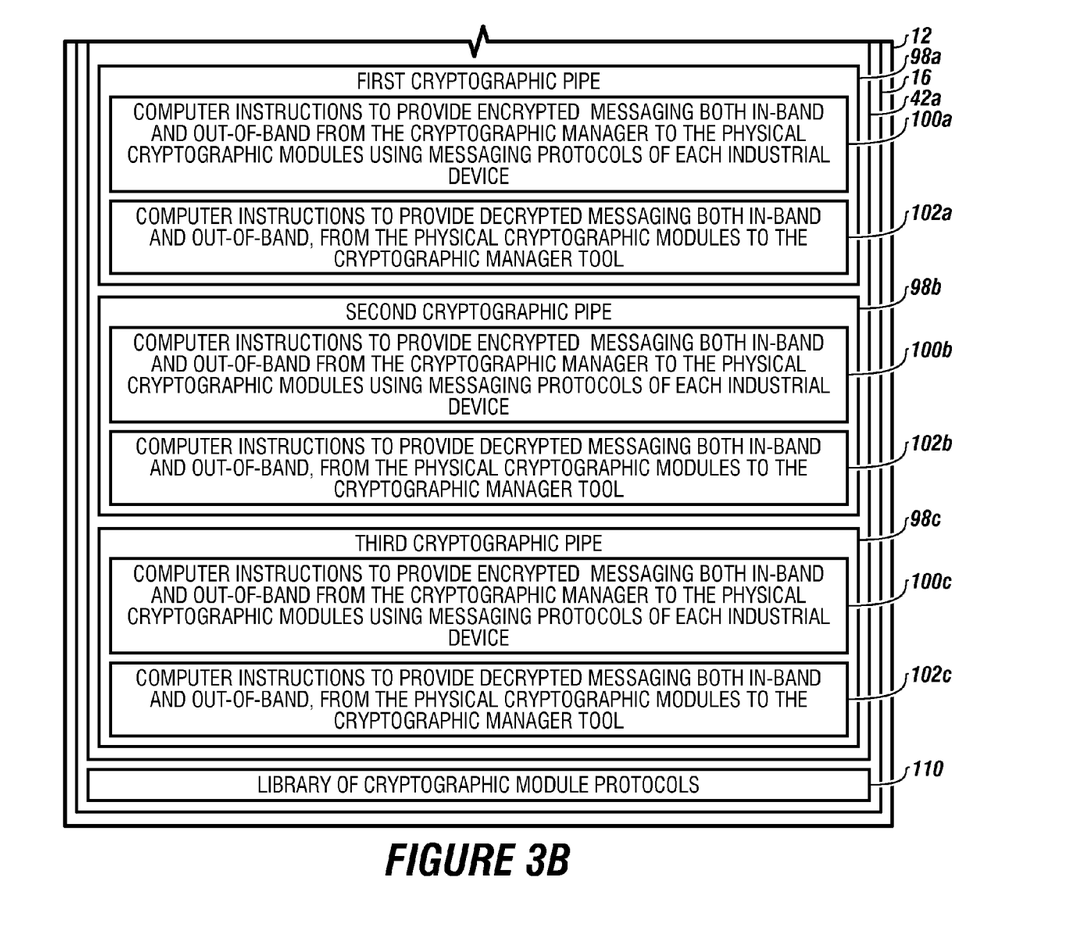

FIG. 3A and FIG. 3B depict a schematic of an enterprise server 12.

The enterprise server 12 can include the enterprise processor 14 and the enterprise data storage 16. The enterprise server 12 can also include the first cryptographic manager tool 42a.

The first cryptographic manager tool 42a can include a plurality of virtual cryptographic modules, shown here as first virtual cryptographic module 50a, second virtual cryptographic module 50b, and their virtual cryptographic module 50c.

The first cryptographic manager tool 42a can include computer instructions to monitor, configure and reconfigure online and on demand, continuously, a plurality of cryptographic pipes simultaneously 80.

The term "cryptographic pipe" as used herein can refer to a virtual pipe connecting the physical cryptographic module to the enterprise server and can refer to software programs with unique computer instructions and combinations thereof.

The first cryptographic manager tool 42a can include computer instructions to monitor, configure, and reconfigure online and on demand, continuously, a plurality of physical cryptographic modules simultaneously 82.

The first cryptographic manager tool 42a can include computer instructions to monitor, configure, and reconfigure online and on demand, continuously, a plurality of virtual cryptographic modules simultaneously 84.

The first cryptographic manager tool 42a can include computer instructions to generate cryptographic keys for: digital signatures in authentication certificates, cryptographic key exchanges, and cryptographic communication sessions between a plurality of virtual cryptographic modules and a plurality of physical cryptographic modules, without human intervention, allowing online encryption and decryption of plain text commands, status and measurement data, messages, log information, and alarm messages without turning off any operating industrial devices, and without turning off the enterprise server and while creating an auditable communication pathway from the enterprise server to operating industrial devices 86.

The first cryptographic manager tool 42a can include computer instructions to transmit plain text setting information through the cryptographic pipes 88.

The first cryptographic manager tool can include computer instructions to receive plain text setting information from the cryptographic pipes 90.

The first cryptographic manager tool 42a can include a library of virtual cryptographic module settings 92. The library of virtual cryptographic module settings 92 can include, but is not limited to: a pipe local IP address, a pipe time out, a pipe remote IP address, a pipe buffer size, a pipe listen IP address, a local port, a remote port, a pipe protocol, a pipe auto-enable, and multiples or combinations thereof.

The first cryptographic manager tool 42a can include a library of physical cryptographic module settings 94. The library of physical cryptographic module settings can include, but are not limited to: a tag; a mac address; a lock status, such as a memory lock; a host port; a device port; and combinations of these settings. The host port can be an RS232 port, an RS485 port, an RS422 port, an Ethernet port, a TCPIP port, a mesh radio network, and combinations thereof. The device port can have the same kinds of ports as the host port.

The library of physical cryptographic module settings 94 can also include, but is not limited to: a closed connection time out, inter-character time outs, a graphic user ID (GUID), a date created, a date last synched, a number of synchronization, a serial number, a status flag, a status string, notes, and combinations thereof.

The first cryptographic manager tool 42a can include computer instructions to schedule generation of cryptographic keys by the virtual cryptographic module, the physical cryptographic module, or combinations thereof, using cryptographic time outs 96.

The first cryptographic manager tool 42a can include one or more cryptographic pipes, shown here as first cryptographic pipe 98a, second cryptographic pipe 98b, and third cryptographic pipe 98c. The cryptographic pipes 98a, 98b, and 98c can communicate with one or more of the virtual cryptographic modules 50a, 50b, and 50c.

The first cryptographic pipe 98a can include computer instructions to provide encrypted messaging both in-band and out-of-band from the cryptographic manager tool to the physical cryptographic modules using messaging protocols of each industrial device 100a.

The first cryptographic pipe 98a can also include computer instructions to provide decrypted messaging both in-band and out-of-band, from the physical cryptographic modules to the cryptographic manager tool 102a.

The second cryptographic pipe 98b can include computer instructions to provide encrypted messaging both in-band and out-of-band from the cryptographic manager tool to the physical cryptographic modules using messaging protocols of each industrial device 100b.

The cryptographic pipe 98b can also include computer instructions to provide decrypted messaging both in-band and out-of-band, from the physical cryptographic modules to the cryptographic manager tool 102b.

The third cryptographic pipe 98c can include computer instructions to provide encrypted messaging both in-band and out-of-band from the cryptographic manager tool to the physical cryptographic modules using messaging protocols of each industrial device 100c.

The cryptographic pipe 98c can also include computer instructions to provide decrypted messaging both in-band and out-of-band, from the physical cryptographic modules to the cryptographic manager tool 102c.

The enterprise server 12 can include a library of cryptographic module protocols 110.

Figure 4:
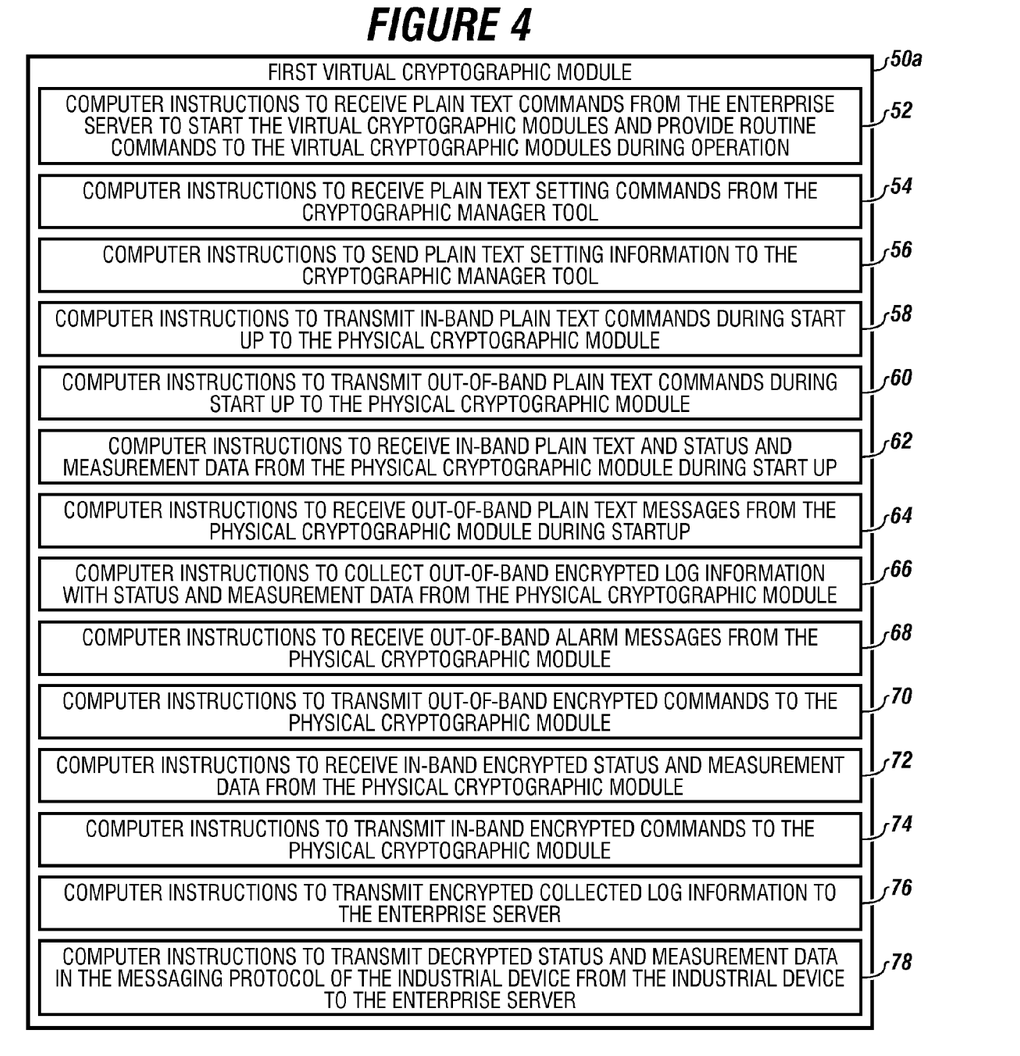
FIG. 4 depicts a diagram of computer instructions in the data storage of a virtual cryptographic module within a cryptographic manager tool according to an embodiment.

FIG. 4 depicts a schematic of a virtual cryptographic module contained within the cryptographic manager tool.

The first virtual cryptographic module 50a can have computer instructions to receive plain text commands from the enterprise server to start the virtual cryptographic modules and provide routine commands to the virtual cryptographic modules during operation 52.

The first virtual cryptographic module 50a can have computer instructions to receive plain text setting commands from the cryptographic manager tool 54.

The first virtual cryptographic module 50a can have computer instructions to send plain text setting information to the cryptographic manager tool 56.

The first virtual cryptographic module 50a can have computer instructions to transmit in-band plain text commands during start up to the physical cryptographic module 58.

The first virtual cryptographic module 50a can have computer instructions to transmit out-of-band plain text commands during start up to the physical cryptographic module 60.

The first virtual cryptographic module 50a can have computer instructions to receive in-band plain text and status and measurement data from the physical cryptographic module during start up 62.

The first virtual cryptographic module 50a can have computer instructions to receive out-of-band plain text messages from the physical cryptographic module during startup 64, which can include performance data.

The first virtual cryptographic module 50*a* can have computer instructions to collect out-of-band encrypted log information with status and measurement data from the physical cryptographic module 66. In embodiments, the log information can be performance information and information that indicates a breach of security.

The first virtual cryptographic module 50*a* can have computer instructions to receive out-of-band alarm messages from the physical cryptographic module 68.

The first virtual cryptographic module 50*a* can have computer instructions to transmit out-of-band encrypted commands to the physical cryptographic module 70.

The first virtual cryptographic module 50*a* can have computer instructions to receive in-band encrypted status and measurement data from the physical cryptographic module 72.

The first virtual cryptographic module 50*a* can have computer instructions to transmit in-band encrypted commands to the physical cryptographic module 74.

The first virtual cryptographic module 50*a* can have computer instructions to transmit encrypted collected log information to the enterprise server 76.

The first virtual cryptographic module 50*a* can have computer instructions to transmit decrypted status and measurement data in the messaging protocol of the industrial device from the industrial device to the enterprise server 78.

While these embodiments have been described with emphasis on the embodiments, it should be understood that within the scope of the appended claims, the embodiments might be practiced other than as specifically described herein.

What is claimed is:

1. An auditable cryptographic protected communication system for connecting an enterprise server to a plurality of industrial devices using at least one messaging protocol for each industrial device enabling the industrial devices to receive commands and transmit status and measurement data using the at least one messaging protocol for each industrial device over a network, wherein the auditable cryptographic protected communication system comprises:
   a. the enterprise server having an enterprise processor and an enterprise data storage, wherein the enterprise server communicates in each messaging protocol of each industrial device connected to the network using in-band and out-of-band messages;
   b. a plurality of physical cryptographic modules, each physical cryptographic module has a physical cryptographic module processor with a physical cryptographic module data storage, and wherein the plurality of physical cryptographic modules are disposed between the enterprise server and each industrial device for communicating in-band messages to each industrial device using the messaging protocol of each industrial device, and wherein each physical cryptographic module data storage comprises:
      (i) computer instructions to receive in-band plain text status and measurement data in the messaging protocol of the industrial device in communication therewith;
      (ii) computer instructions to transmit in-band decrypted commands to the industrial device, in communication therewith;
      (iii) computer instructions for providing encrypted messaging both in-band and out-of-band from the industrial device, in communication therewith, using the messaging protocol of the industrial device; and
      (iv) computer instructions to generate cryptographic keys for:
         1. digital signatures in authentication certificates;
         2. cryptographic key exchanges; and
         3. cryptographic communication sessions between the plurality of physical cryptographic modules and a cryptographic manager tool without human intervention, allowing online encryption and decryption of plain text commands, status and measurement data, messages, log information, and alarm messages, without turning off any operating industrial devices, and without turning off the enterprise server and while creating an auditable communication pathway from enterprise server to operating industrial devices; and
   c. the cryptographic manager tool for communication between the plurality of physical cryptographic modules and the enterprise server for in-band and out-of-band communication with each of the physical cryptographic modules, for in-band and out-of-band communication with the industrial devices, wherein the cryptographic manager tool resides in the enterprise data storage or in a second data storage of a second server having a second processor, on the network, wherein the cryptographic manager tool comprises:
      (i) a plurality of virtual cryptographic modules, wherein each virtual cryptographic module comprises:
         1. computer instructions to receive plain text commands from the enterprise server to start at least one virtual cryptographic module of the plurality of virtual cryptographic modules and provide routine commands to the at least one virtual cryptographic module during operation;
         2. computer instructions to receive plain text setting commands from the cryptographic manager tool;
         3. computer instructions to transmit plain text information to the cryptographic manager tool;
         4. computer instructions to transmit in-band plain text commands during start up to the physical cryptographic module;
         5. computer instructions to transmit out-of-band plain text commands during start up to the physical cryptographic module;
         6. computer instructions to receive in-band plain text and status and measurement data from the physical cryptographic module during start up;
         7. computer instructions to receive out-of-band plain text messages from the physical cryptographic module during start up;
         8. computer instructions to receive out-of-band encrypted log information with status and measurement data from the physical cryptographic module;
         9. computer instructions to receive out-of-band alarm messages from the physical cryptographic module;
         10. computer instructions to transmit out-of-band encrypted commands to the physical cryptographic module;
         11. computer instructions to receive in-band encrypted status and measurement data from the physical cryptographic module;
         12. computer instructions to transmit in-band encrypted commands to the physical cryptographic module;
         13. computer instructions to transmit encrypted collected log information to the enterprise server; and 14. computer instructions to transmit decrypted status and measurement data in the messaging protocol of the industrial device from the industrial device to the enterprise server;

(ii) computer instructions to monitor, configure and reconfigure online and on demand, continuously, a plurality of cryptographic pipes simultaneously;

(iii) computer instructions to monitor, configure, and reconfigure online and on demand, continuously, the plurality of physical cryptographic modules, simultaneously;

(iv) computer instructions to monitor, configure, and reconfigure online and on demand, continuously, the plurality of virtual cryptographic modules simultaneously;

(v) computer instructions to generate cryptographic keys for:
  1. digital signatures in authentication certificates;
  2. cryptographic key exchanges; and
  3. cryptographic communication sessions between the plurality of virtual cryptographic modules and the plurality of physical cryptographic modules, without human intervention, allowing online encryption and decryption of plain text commands, status and measurement data, messages, log information, and alarm messages without turning off any operating industrial devices, and without turning off the enterprise server and while creating an auditable communication pathway from the enterprise server to operating industrial devices;

(vi) computer instructions to transmit plain text setting information to at least one cryptographic pipe of the plurality of cryptographic pipes;

(vii) computer instructions to receive plain text setting information from at least one cryptographic pipe of the plurality of cryptographic pipes;

(viii) a library of virtual cryptographic module settings;

(ix) a library of physical cryptographic module settings;

(x) computer instructions to schedule generation of cryptographic keys by the virtual cryptographic module, by the physical cryptographic module, or combinations thereof, using cryptographic time outs; and (xi) the plurality of cryptographic pipes, wherein at least one cryptographic pipe of the plurality of cryptographic pipes communicates with at least one virtual cryptographic module of the plurality of virtual cryptographic modules.

2. The auditable cryptographic protected communication system of claim 1, further comprising a security enclosure creating a tamperproof enclosure around each physical cryptographic module.

3. The auditable cryptographic protected communication system of claim 2, wherein the security enclosure is an explosion proof, weather proof enclosure.

4. The auditable cryptographic protected communication system of claim 2, further comprising a tamper detection means connected to an input/output of the security enclosure, wherein the tamper detection means detects access to the security enclosure.

5. The auditable cryptographic protected communication system of claim 4, wherein the tamper detection means comprises a member of the group consisting of: computer instructions that detect when the security enclosure is opened, a circuit that indicates when the circuit is no longer complete, a sensor connected to one or more security programs when the security enclosure is breached, an audible alarm connected to one or more security programs when the security enclosure is breached, a visual alarm connected to one or more security programs when the security enclosure is breached, a digital alarm and notification system that provides a message when the security enclosure is breached, an electronic messaging alarm that indicates when the security enclosure is breached, an activated automated phone call connected to one or more security programs when the security enclosure is breached, a software program that generates exception reports when the security enclosure is breached, a text message connected to one or more security programs when the security enclosure is breached, an email connected to one or more security programs when the security enclosure is breached, or combinations thereof.

6. The auditable cryptographic protected communication system of claim 1 wherein the enterprise server comprises a library of cryptographic module protocols for out-of-band communication with the cryptographic manager tool.

7. The auditable cryptographic protected communication system of claim 1, wherein the library of virtual cryptographic module settings includes a member of the group consisting of: a pipe local IP address, pipe time outs, a pipe remote IP address, a pipe buffer size, a pipe listen IP address, a local port, a remote port, a pipe protocol, a pipe auto-enable, and combinations thereof.

8. The auditable cryptographic protected communication system of claim 1, wherein the library of physical cryptographic module settings includes a member of the group consisting of: a tag, a mac address, a lock status, a host port, a device port, closed connection time outs, inter-character time outs, a graphic user ID (GUID), a date created, a date last synched, a number of synchronization, a serial number, a status flag, a status string, a note, and combinations thereof.

9. The auditable cryptographic protected communication system of claim 8, wherein the host port is an RS232 port, an RS485 port, an RS422 port, an Ethernet port, a TCPIP port, or a mesh radio network port.

10. The auditable cryptographic protected communication system of claim 8, wherein the device port is an RS232 port, an RS485 port, an RS422 port, an Ethernet port, a TCPIP port, or a mesh radio network port.

11. The auditable cryptographic protected communication system of claim 1, wherein each cryptographic pipe comprises:
   a. computer instructions to provide encrypted messaging both in-band and out-of-band from the cryptographic manager tool to the physical cryptographic modules using messaging protocols of each industrial device; and
   b. computer instructions to provide decrypted messaging both in-band and out-of-band, from the physical cryptographic modules to the cryptographic manager tool.

12. The auditable cryptographic protected communication system of claim 1, wherein the out-of-band encrypted log information with status and measurement data from the physical cryptographic module comprises performance information and information that indicates a breach of security simultaneously.

13. The auditable cryptographic protected communication system of claim 1, wherein the enterprise server communicates with the plurality of industrial devices over a plurality of different networks simultaneously, consecutively, or combinations thereof.

14. The auditable cryptographic protected communication system of claim 13, wherein the plurality of different networks comprise: a radio/cellular network, a worldwide network, a corporate network, and a local area control network.

* * * * *